United States Patent [19]

Naruse

[11] Patent Number: 5,293,976

[45] Date of Patent: Mar. 15, 1994

[54] BRAKE-AND ACCELERATOR PEDAL ASSEMBLY

[76] Inventor: Masuyuki Naruse, 603, Noguchi, Taimei-machi, Tamana-gun, Kumamoto-ken, 869-02, Japan

[21] Appl. No.: 907,980

[22] Filed: Jul. 2, 1992

[30] Foreign Application Priority Data

Jul. 11, 1991 [JP] Japan .................... 3-196162
Nov. 1, 1991 [JP] Japan .................... 3-313145
Apr. 9, 1992 [JP] Japan .................... 4-115280

[51] Int. Cl.$^5$ .................... B60K 41/20; E05B 65/06
[52] U.S. Cl. .................... 192/1.57; 74/513; 192/1.56; 192/1.6
[58] Field of Search .................... 192/1.52, 1.56, 1.57, 192/1.6; 74/478.5, 562, 478, 513

[56] References Cited

U.S. PATENT DOCUMENTS 1,543,578  6/1925  Labasse ...................... 192/1.57
2,707,036  4/1955  Hollub ...................... 192/1.6

FOREIGN PATENT DOCUMENTS 689844   9/1930  France .................... 192/1.57
38177    4/1931  France .................... 192/1.56
460618   2/1937  United Kingdom .......... 192/1.57

Primary Examiner—Rodney H. Bonck
Attorney, Agent, or Firm—Nikaido, Marmelstein, Murray & Oram

[57] ABSTRACT

Disclosed is an improved brake-and-accelerator pedal assembly for an automobile driving use. In order to attain natural, smooth foot control, an accelerator pedal is fixed swingably in lateral direction to a selected stationary part of the automobile body, and is resiliently urged toward the brake pedal just above the right side of the brake pedal, whereby acceleration drive is controlled by rotating driver's foot about the heel to push the accelerator pedal laterally. This arrangement permits a driver to operate the accelerator pedal simply by turning the toe a little about the heel of the foot with the foot remaining on the brake pedal.

9 Claims, 9 Drawing Sheets

BRAKE-AND ACCELERATOR PEDAL ASSEMBLY

BACKGROUND OF THE INVENTION

1. Field of the Invention

The present invention relates to a brake-and-accelerator pedal assembly for an automobile driving use, and particularly a brake-and-accelerator pedal assembly which is designed in an attempt to improve the operating facility, and quick and safety-assuring operation.

2. Description of Related Art

In an attempt to improve the operating facility, and quick and safety-assuring operation of different pedal mechanisms in the driver's seat a variety of proposals have been offered as for instance follows: John L. Millar et al proposed a brake pedal-and-foot rest hinged link connection (U.S. Pat. No. 3,108,651); and H. J. Cocks proposed an accelerator pedal-and-foot rest combination (U.S. Pat. No. 1,715,336).

The former proposal is an improvement of the brake pedal designed for automatic automobiles, reducing the braking stroke to the extent that the braking operation may be permitted while the foot remains on the foot rest. In the latter proposal the free end of the rotatable foot rest remains on the accelerator pedal, which is adapted to be operated by applying a pressure to the free end of the rotatable foot rest with the foot.

Another proposal offered by Nsin-Hsin Lo is a longitudinal arrangement of accelerator pedal, foot stand and brake pedal in the order named (U.S. Pat. No. 4,802,381). Particularly, the foot stand is fixed to the floor, and the accelerator pedal is ahead of the foot stand and the brake pedal is behind the foot stand. This arrangement permits the driver to operate the accelerator pedal with the toe and the brake pedal with the heel of the driver's foot.

An improvement proposed by John L. Millar et al (U.S. Pat. No. 3,108,651) is directed only to a brake pedal whereas an improvement proposed by H. J. Cocks is directed only to an accelerator pedal. These improvements are not directed to the designing of facilitating the switching from the operation of the brake pedal to the operation of the accelerator pedal or vice versa. These pedals are operated independently by moving the driver's leg about the hip joint to shift the foot from the brake pedal to the accelerator pedal or vice versa. This is a relatively large movement, and accordingly the switching is not quick. Still disadvantageously, the driver's posture is liable to somewhat change and lose balance. When changing ordinary automobiles to automatic ones drivers are liable to be anxious about putting their feet on wrong foot pedals in driving.

An improvement proposed by Nsin-Hsin Lo (U.S. Pat. No. 4,802,381) is directed to the smooth, quick switching between braking and accelerating operations. It, however, requires a relatively large amplitude of back-and-forth inclination of the driver's foot about the arch of the foot to assure reliable operation. As a matter of fact, however, the range within which the driver can incline his foot about the arch of the foot is very limited, and accordingly the actual strokes both of the brake and accelerator pedals must be reduced to a possible minimum. As a consequence, a very delicate and accurate operation is required both in acceleration and wheel braking. In this connection it is most likely that in case of emergency drivers cannot perform a required fine control. Still disadvantageously, drivers cannot put their heels on the floor, and therefore, their postures are not stable, and drivers will get tired easily in driving.

SUMMARY OF THE INVENTION

One object of the present invention is to provide a driving control mechanism which permits the quick, smooth switching from acceleration to wheel braking or vice versa without a substantial amount of foot shift from the accelerator pedal to the brake pedal or vice versa, thereby improving the operating facility of the foot control.

Another object of the present invention is to provide a driving control mechanism which assures that drivers can take a stable posture while driving, thereby guaranteed free of fatigue even after a long-distance driving.

Still another object of the present invention is to provide a driving control mechanism which permits the natural guiding of the driver's foot to the braking pedal on emergency.

To attain these objects a brake-and-accelerator pedal assembly according to the present invention comprises a brake pedal and an accelerator pedal which is fixed swingably in lateral direction to a selected stationary part of the automobile body, and is resiliently urged toward said brake pedal just above the right side of said brake pedal, whereby acceleration drive is controlled by rotating driver's foot about its heel to push said accelerator pedal laterally. This arrangement permits a driver to operate the accelerator pedal simply by rotating somewhat the toe about the heel with the foot remaining on the brake pedal. The force which is applied to the accelerator pedal can be controlled simply by rotating the foot about the heel laterally with the driver's knee remaining still in outward diverging position, and therefore, the driver can take a relaxed posture even in driving a long distance.

The brake pedal may have a guide roller partly appearing from an opening made at its right end, said roller being rotatable in opposite directions to cause the ball of the foot to move smoothly leftward and rightward. This contributes the smooth, quick switching from acceleration to braking and vice versa.

The brake pedal may have a permanent magnet of one polarity fixed to its right end, and another permanent magnet of the opposite polarity is fixed to a selected stationary part of the automobile body to be placed in the vicinity of said permanent magnet of one polarity. This arrangement assures that the brake pedal is put in a predetermined position in non-load condition. Alternatively, the brake pedal may have a rising plate integrally connected to its right end, said rising plate having a shallow recess on its outer side to allow a ball to be partly fitted in said shallow recess, and push said rising plate leftward under the resilient influence of spring to put said brake pedal in non-load position.

The brake pedal may have a guide slope gradually rising and extending to its right end. This contributes a stable operation of the foot control even in case of the tilting of the automobile body.

The proximal edge of the brake pedal may be inclined toward the accelerator pedal to leave a substantial space in which there exists a foot step, which is integrally connected to and extending inward from the end of the accelerator pedal. This arrangement enlarges the area on which the driver's foot can be put, and at the same time, permits the heel to move freely. Accordingly the stableness with which the driver's foot controls the brake and accelerator pedals is increased.

The brake pedal may be large enough to permit the heel-to-toe area of the driver's foot to be put thereon, the lower edge of the brake pedal being slidably put on the floor whereas the upper edge of the brake pedal being rotatably fixed to an associated brake rod. This arrangement permits the driver's foot to be supported by the brake pedal, and therefore, the driver will not get tired after driving a long distance. The point of force of the driver's foot can be put on the heel, thereby permitting the foot to be supported by the lower edge of the brake pedal without fear of incidental braking, and braking can be effected simply by lowering the toe.

The brake pedal may comprise further a clutch pedal, the lower edge of the clutch pedal being slidably put on the floor whereas the upper edge of the clutch pedal being rotatably fixed to an associated clutch rod. This arrangement permits the driver's foot to be put on the clutch pedal at rest, permitting the quick and accurate clutch operation.

The brake pedal may comprise further a foot-push lever to push the accelerator pedal laterally. The foot-push lever is rotatably fixed to the right, upper end of the brake pedal.

As may be understood from the above, in a brake-and-accelerator pedal assembly according to the present invention an accelerator pedal is fixed swingably in lateral direction to a selected stationary part of the automobile body, and is resiliently urged toward the brake pedal just above the right side of the brake pedal, whereby acceleration drive is controlled by rotating driver's foot about its heel to push said accelerator pedal laterally. This arrangement permits a driver to operate the accelerator pedal simply by rotating the toe a little about the heel of the foot with the foot remaining on the brake pedal. Thus, the natural, smooth foot control results, and accordingly the quickness and easiness in controlling the accelerator and brake pedals are remarkably increased.

The part of accelerator pedal to which a push is given for acceleration is at a level somewhat higher than the level of the brake pedal, and therefore, the accelerator pedal is guaranteed free of any influence caused by putting the foot down in braking operation. The brake-and-accelerator pedal assembly is so constructed that in emergency the driver's foot may be naturally led to the brake pedal, and therefore, there is no possibility of traffic accident caused by excessive acceleration.

Also, the brake-and-accelerator pedal assembly is so constructed that the driver may support his weight on the heel of his foot with his foot remaining on the pedal, thus permitting the driver to take a stable driving posture.

Other objects and advantages of the present invention will be understood from the following description of brake-and-accelerator pedal assemblies according to preferred embodiments of the present invention, which are shown in accompanying drawings.

DESCRIPTION OF THE PREFERRED EMBODIMENTS

Figure 1:
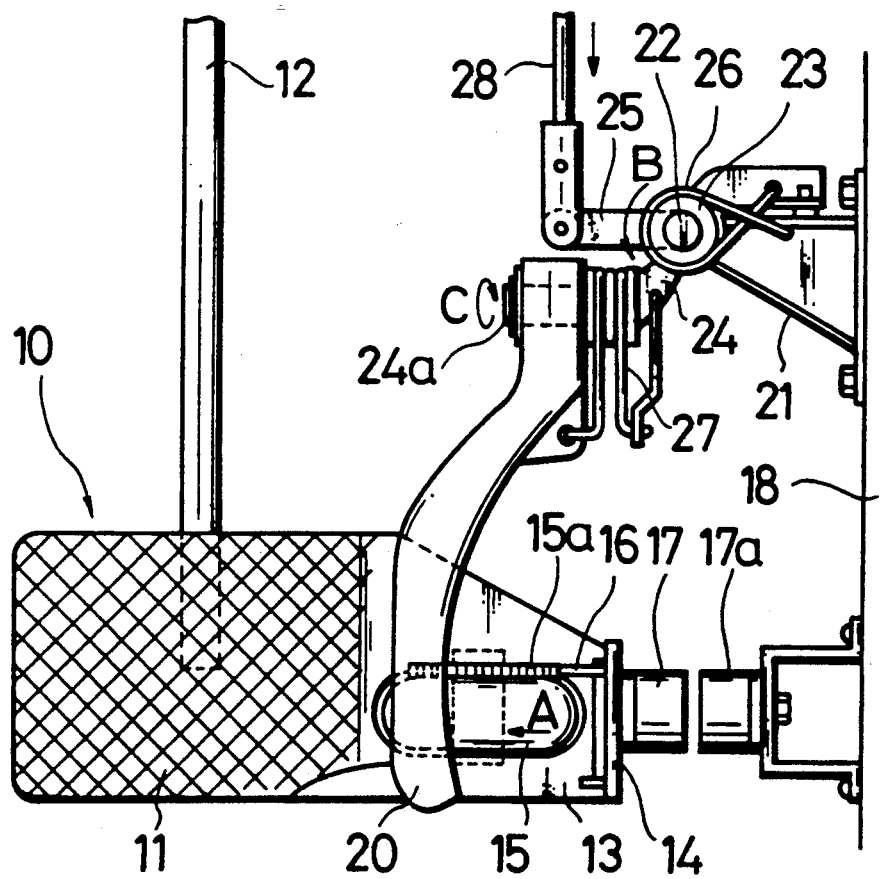
FIG. 1 is a plane view of a brake-and-accelerator pedal assembly according to a first embodiment of the present invention.

FIG. 1 shows a brake-and-accelerator pedal assembly according to a first embodiment of the present invention. It comprises a brake pedal 10 and an accelerator pedal 20. The brake pedal 10 is a rectangular plate having cross-grooves made or rubber attached on its upper surface 11 to prevent the slipping of the driver's foot thereon. The brake pedal 10 has a transmission rod 12 fixed to its rear surface. Also, it has a gentle slope guide 13 ending with an upright stopper 14.

Figure 2:
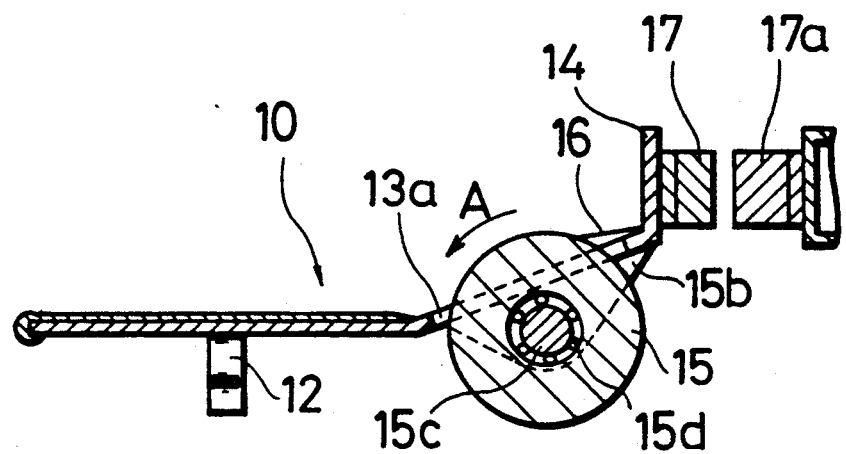
FIG. 2 is a cross-section of the brake pedal of the brake-and-accelerator pedal assembly of FIG. 1.
Figure 3:
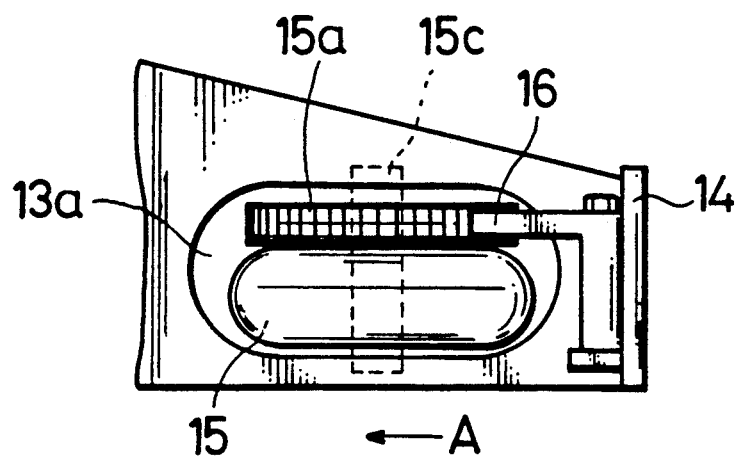
FIG. 3 is an enlarged plane view of the guide roller of the brake pedal.
Figure 4:
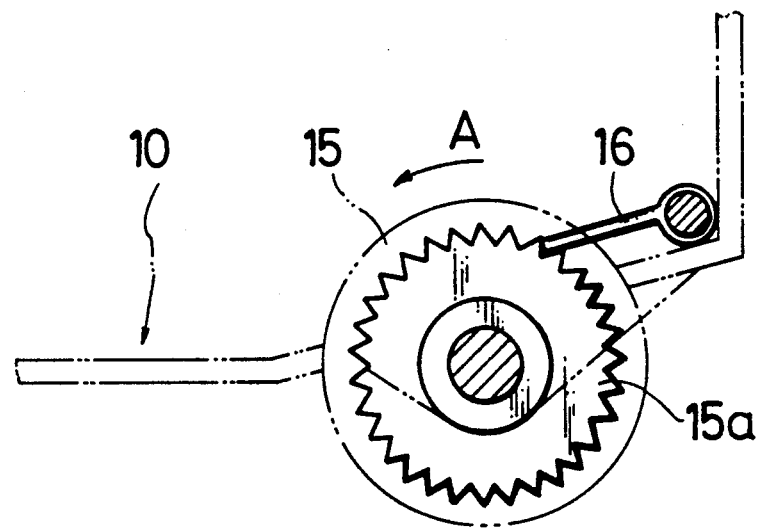
FIG. 4 shows the ratchet wheel of the guide roller of the brake pedal.

The slope guide 13 has a guide roller 15 rotatably fixed thereto. As best seen from FIGS. 2 and 3, the guide roller 15 partly appears from the elliptical opening 13a of the guide slope 13, and its axle 15c is journaled by bearings 15d, which are supported by brackets 15b integrally connected to the back of the guide slope 13. The guide roller 15 has a ratchet wheel 15a fixed to one side thereof, and the ratchet wheel 15a is prevented from rotating clockwise by an associated nail 16, which is fixed to the inside wall of the stopper 14. Thus, the guide roller 15 is allowed to rotate counterclockwise as indicated by arrow A. Therefore, when the driver's foot is put on the guide roller 15, it is liable to move apart from the accelerator pedal 20 as indicated by arrow A in FIG. 3.

A permanent magnet of one polarity 17 is attached to the outer surface of the stopper 14 whereas another permanent magnet of the other polarity 17a is attached to the side wall 18 of the driver's compartment, leaving a small gap between these permanent magnets 17 and 17a. Thus, when no load is applied to the brake pedal 10, the brake pedal 10 is put in balanced position under the attractive influence between these permanent magnets 17 and 17a.

Figure 5:
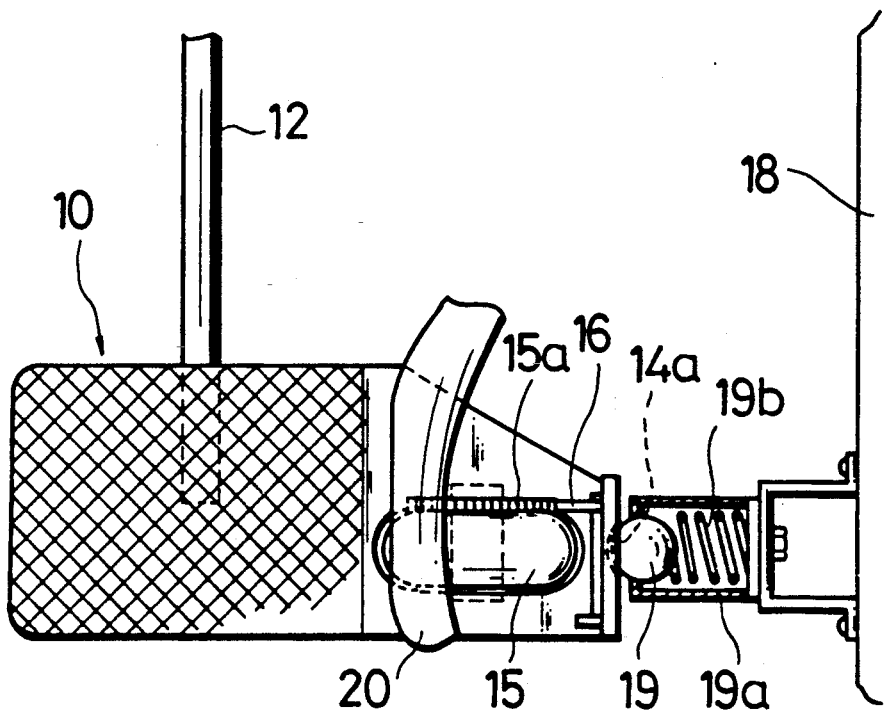
FIG. 5 is a plane view of the brake pedal equipped with a pedal retainer in place of the magnet pedal retainer in FIG. 1.

Alternatively, as shown in FIG. 5, the stopper 14 has a shallow hemispherical recess 14a on its outer side to allow a metal ball 19 to be partly fitted in the shallow recess 14a, and push the stopper 14 leftward under the resilient influence of a coiled spring 19b, which is contained in a hollow cylinder 19a fixed to the side wall 18 of the driver's compartment. Thus, the brake pedal 10 is put in non-load position. When the brake pedal 10 is pushed down with the driver's foot, the ball 19 will slip out of the recess 14a of the stopper 14 easily, permitting the releasing of the brake pedal 10. In this alternative no adverse effect will be caused on electronics as is the case with use of permanent magnets.

Again referring to FIG. 1, the accelerator pedal 20 is rotatable about a pivot 22 in the direction as indicated by arrow B. The pivot 22 is supported by a bearing 23, which is fixed to a bracket 21, which, in turn, is fixed to the side wall 18 of the driver's compartment. As shown in the drawing, the accelerator pedal 20 stays just above the left end of the guide slope 13 of the brake pedal 10 in non-load position. A connection rod 24 and a throttle lever 25 are integrally connected to the pivot 22 to form a predetermined angle between the connection rod 24 and the throttle lever 25. The connection rod 24 has a horizontal pivot 24a integrally connected to its end, and the accelerator pedal 20 is rotatably fixed to the horizontal pivot 24a so as to permit rotation of the accelerator pedal 20 as indicated by arrow C.

The accelerator pedal 20 is resiliently biased toward its original position under the influence of a coiled spring 26 in a horizontal plane whereas the accelerator pedal 20 is resiliently biased down toward the brake pedal 10 under the influence of a coiled spring 27 of the connection rod 24 in a vertical plane. The throttle lever 25 is connected to the throttle (not shown) via a throttle wire 28, and the rotation of the accelerator pedal 20 in the horizontal plane will control the throttle. The horizontal rotation of the accelerator pedal 20 is made to stop by the stopper 14 which stands upright on the right end of the brake pedal 10.

Figure 6:
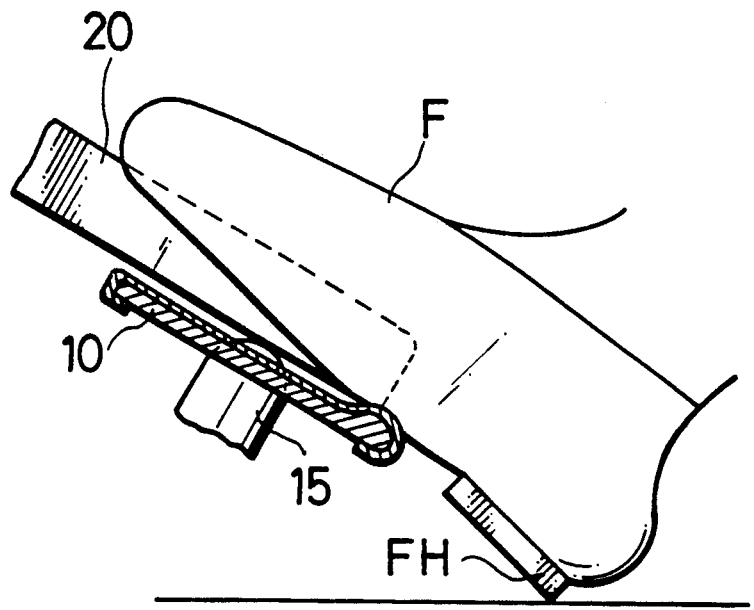
FIGS. 6 and 7 show the manner in which the brake-and-accelerator pedal assembly is operated by the driver's foot.
Figure 7:
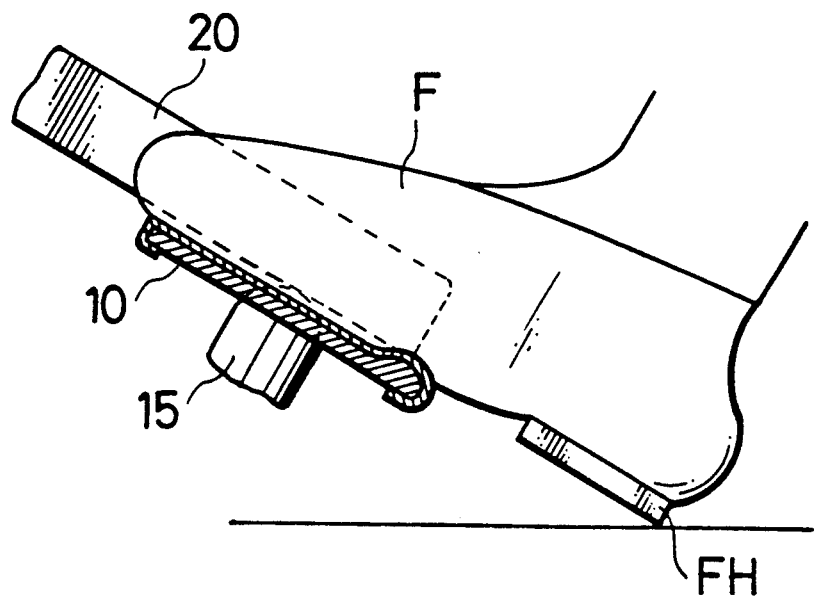

When the accelerator pedal 20 is used, the driver's foot F is rotated rightward about the heel FH as seen from FIG. 6. The driver's foot can be moved smoothly on the guide slope 13 of the brake pedal 10. When the brake pedal 10 is operated, it suffices that the driver's foot turns leftward to push the brake pedal down. Rotation of the guide roller 15 helps the driver's foot to leave the accelerator pedal 20 quickly, thereby permitting the instantaneous shifting of the driver's foot for operating the brake pedal 10. Thus, the operation of either foot pedal requires only rotation of the driver's foot rather than movement of the whole leg about the wrist joint of the driver, and accordingly the pedal operation can be effected faster.

Figure 8:
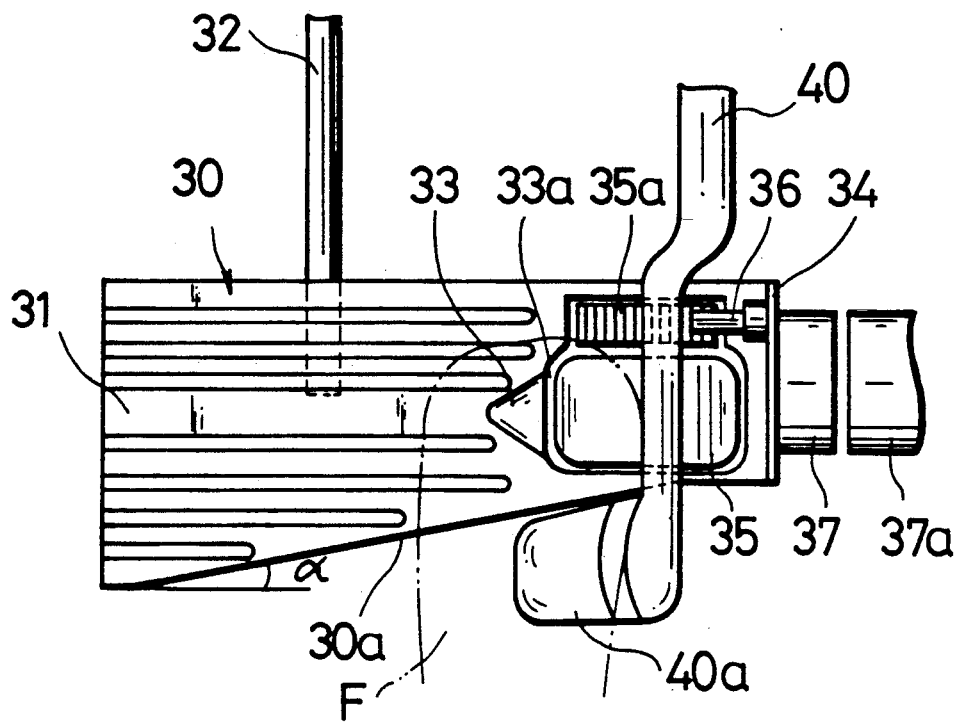
FIG. 8 is a plane view of a brake-and-accelerator pedal assembly according to a second embodiment of the present invention.
Figure 9:
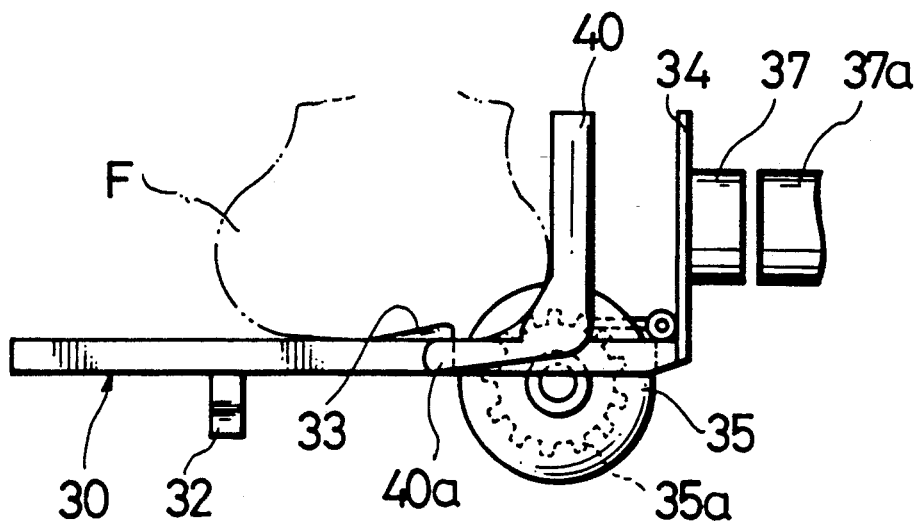
FIG. 9 is a front view, showing how the brake-and-accelerator pedal assembly of FIG. 8 is used.
Figure 10:
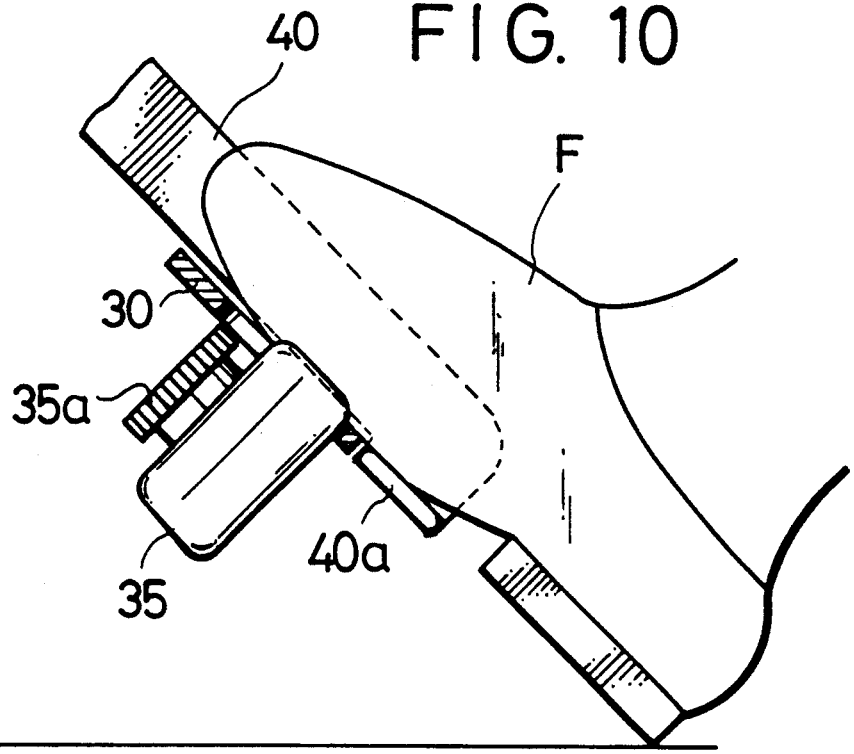
FIG. 10 is a side view, showing how the brake-and-accelerator pedal assembly of FIG. 8 is used.

FIGS. 8 to 10 show a foot pedal arrangement according to another embodiment of the present invention. As shown, a tapering brake pedal 30 is supported by a transmission rod 32, and its proximal edge 30a inclines toward an accelerator pedal 40 to leave a substantial space in which there exists a foot step 40a, which is integrally connected to an extending inward from the end of the accelerator pedal 40.

The brake pedal 30 is flat as a whole, and has a plurality of lateral linear slots to prevent the driver's foot from slipping on its surface, and a guide roller 35 partly appearing from an opening 33a, which is made in the right end of the brake pedal. Also, the brake pedal 30 has a stopper 34 integrally connected to and rising up from its right end to limit the rightward movement of the accelerator pedal 40 beyond the right end of the brake pedal 30. A guide slope 33 is provided to the brake pedal 30 in the vicinity of the opening 33a of the brake pedal 30, thereby permitting the smooth transfer of the driver's foot F from the brake pedal 30 to the accelerator pedal 40. The tapering angle $\alpha$ which the proximal edge 30a forms with a lateral line ranges preferably from 15 to 30 degrees. The guide roller 35, ratchet wheel 35a, nail 36, and permanent magnets 37, 37a are same as used in a foot pedal assembly according to the first embodiment described above, and therefore, description of these parts is omitted.

The foot step 40a of the accelerator pedal 40 extends leftward from the proximal end of the accelerator pedal 40 at the same level as the brake pedal 30 in non-load position. Therefore, the driver can put his foot on the foot step 40a of the accelerator pedal 40 quite naturally. The other parts of the accelerator pedal are same as in a foot pedal assembly according to the first embodiment described above, and therefore, no description of these parts is necessary.

As seen from FIGS. 9 and 10, the transient portion of the driver's foot from the sole to right side of the foot fits on the foot step 40a. This has the effect of reducing the feeling of fatigue in driving. If the accelerator pedal 40 is designed so as to be free of the horizontal pivot 24a, and hence the up-and-down move of the accelerator pedal, the driver may feel like pushing down the accelerator pedal 40 while actually pushing it aside, and this has the effect of reducing the feeling of fatigue in driving, too.

Figure 11:
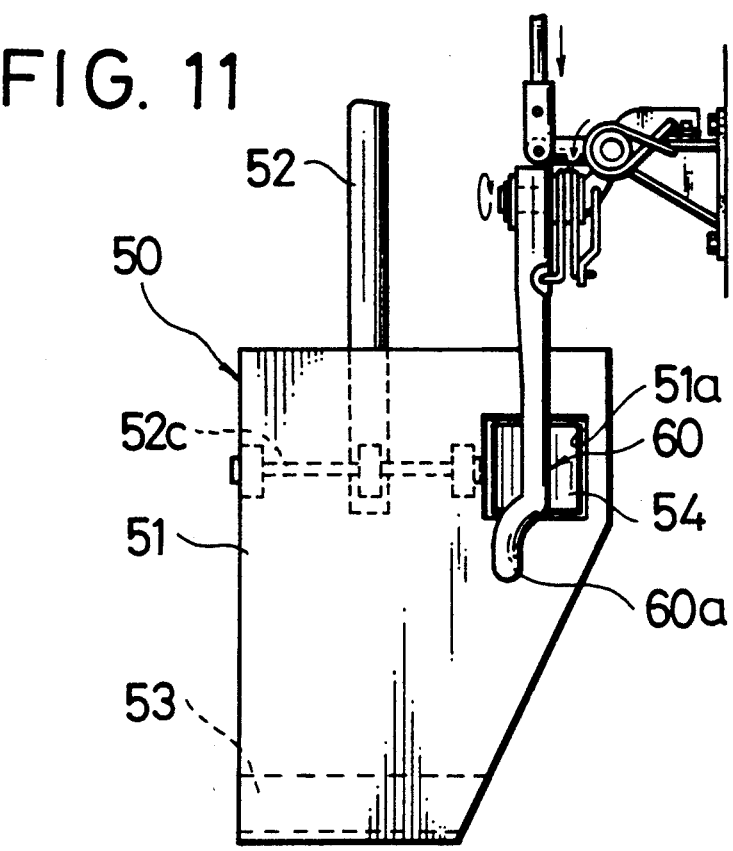
FIG. 11 is a plane view of a brake-and-accelerator pedal assembly according to a third embodiment of the present invention.
Figure 12:
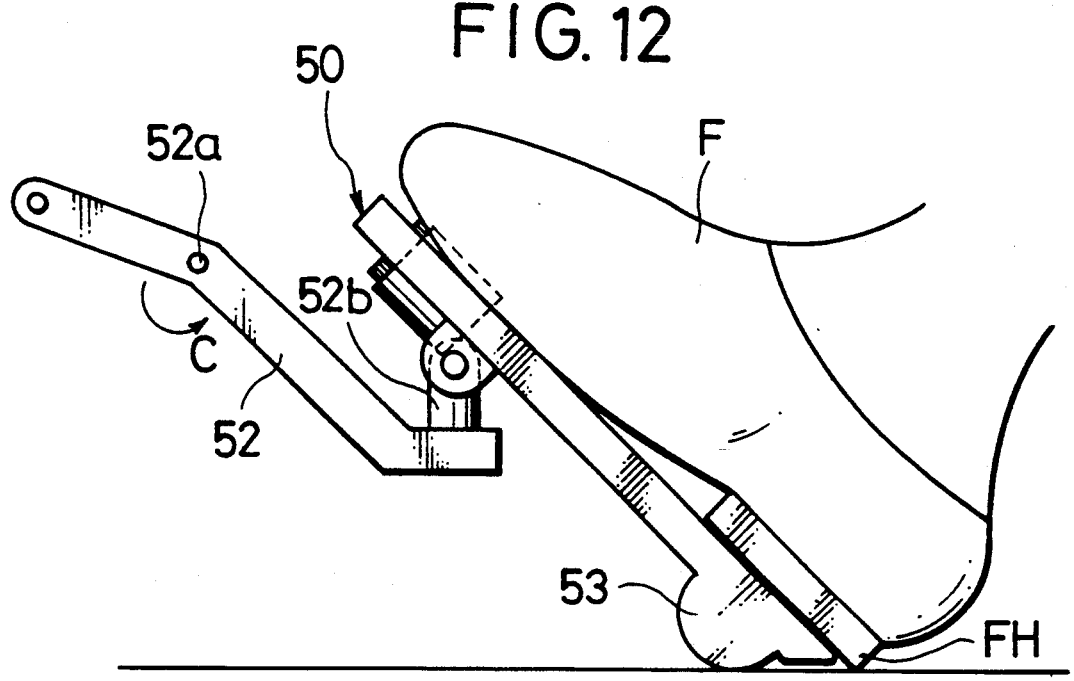
FIG. 12 is a side view of the brake pedal of the brake-and-accelerator pedal assembly of FIG. 11.
Figure 13:
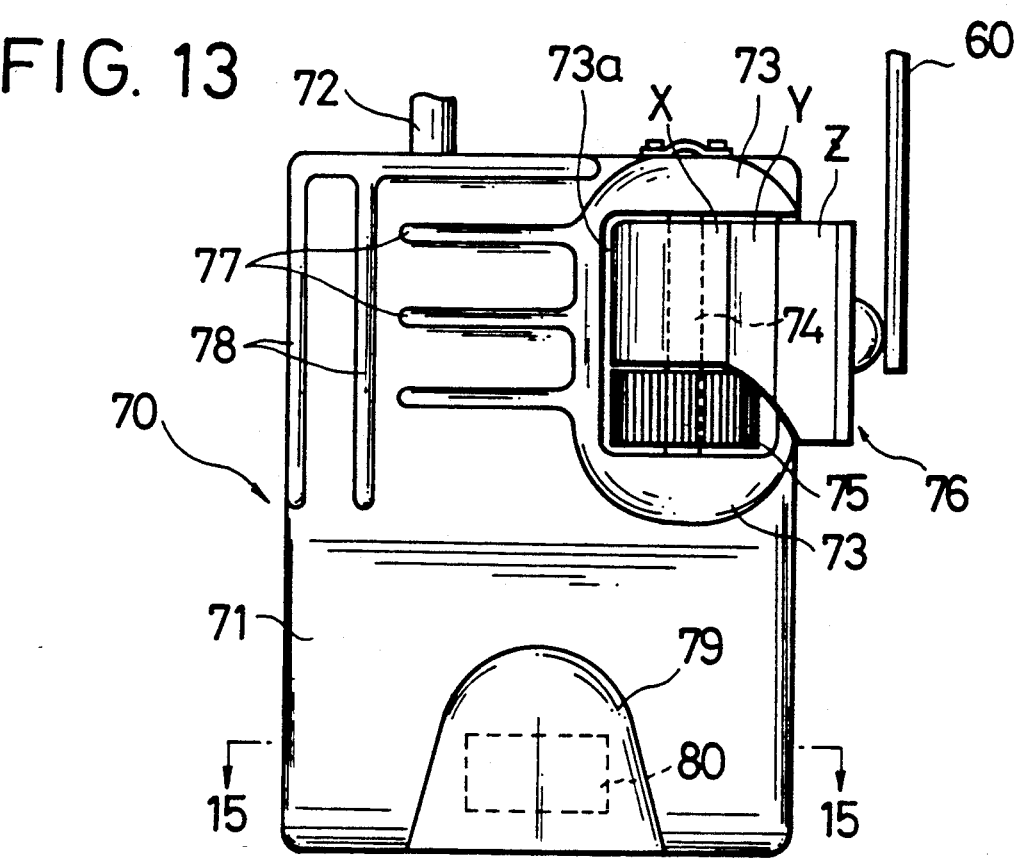
FIG. 13 is a plane view of the brake-and-accelerator pedal assembly according to the third embodiment although its brake pedal is different from that of the brake-and-accelerator pedal assembly of FIG. 11.
Figure 14:
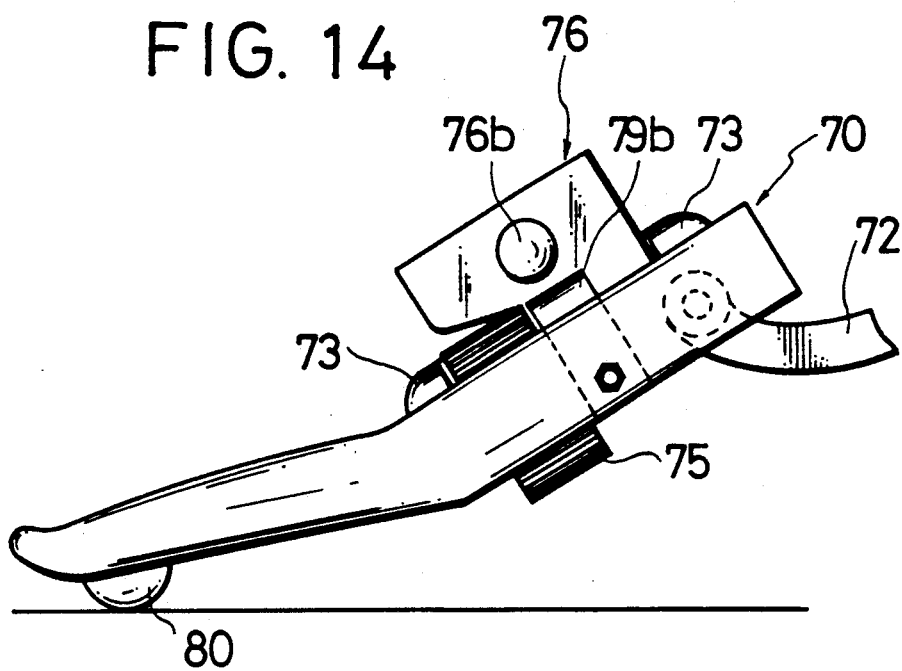
FIG. 14 is a right side view of the brake pedal appearing in FIG. 13.
Figure 15:
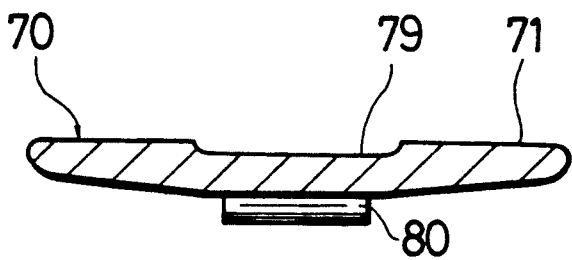
FIG. 15 is a sectional view taken along the line 15—15 in FIG. 13.
Figure 16:
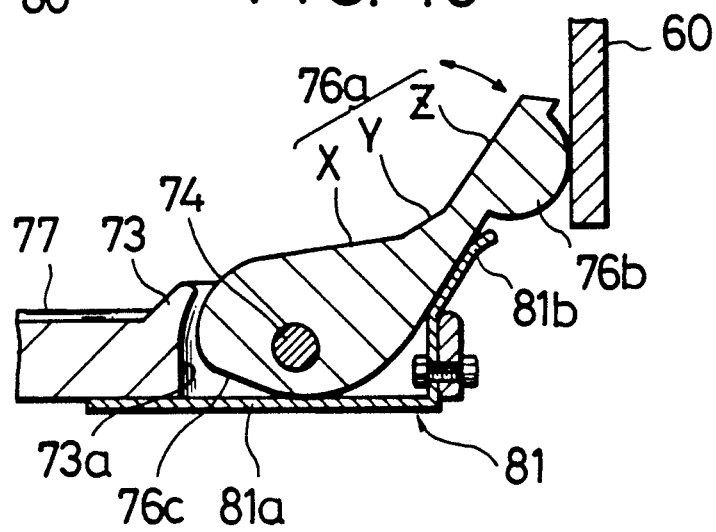
FIG. 16 is a lateral section of the foot-push lever appearing in FIG. 13.

FIGS. 11 and 12 show a foot pedal arrangement according to a third embodiment of the present invention. As shown, it comprises a brake pedal 50 supported by a transmission rod 52, and an accelerator pedal 60, which is designed to be laterally pushed.

The brake pedal 50 has a semicylindrical projection 53 fixed to the rear side of the lower edge of the foot plate 51. The semicylindrical projection 53 is put on the floor, facilitating the sliding of the foot pedal 50 on the floor. The transmission rod 52 is pivoted to the brake pedal 50, and it turns about its pivot 52a, and is spring-biased upward in the direction indicated by arrow C. The end 52b of the transmission rod 52 has a pivot 52c attached to the rear side of the brake pedal 50, thus permitting the brake pedal 50 to turn about the pivot 52c.

As seen from FIG. 11, the guide roller 54 is rotatably fixed to the upper, right area of the brake pedal 50, partly appearing from the opening 51a of the brake pedal 50. The guide roller 54 is adapted to rotate in either direction, i.e. clockwise and anticlockwise, different from the first and second embodiments wherein the guide rollers are allowed to rotate in one direction only.

The accelerator pedal 60 is different from that of the first embodiment only in that it has a curved end 60a, and therefore, detailed description of the accelerator pedal 60 is omitted. The curved end 60a of the accelerator pedal 60 is so positioned that the right side of the driver's foot when put on the brake pedal 50 may contact the curved end 60a of the accelerator pedal 60.

The brake pedal 50 is large enough to permit the heel-to-toe area of the driver's foot to be put thereon. The lower semicylindrical edge 53 of the brake pedal 50 is slidably put on the floor whereas the upper edge of the brake pedal 50 is rotatably fixed to the transmission rod 52. With this arrangement the driver turns his foot F about the heel FH with the substantial sole area of his foot remaining on the foot plate 51. Thus, the driver can operate the foot pedal in a stable, easy way while permitted to hold his weight on the heel of the foot in driving. When turning the driver's foot F about the heel FH, it pushes a relatively reduced area of the curved end 60a of the accelerator pedal 60 with a possible minimum friction, thereby permitting a smooth operation of the accelerator pedal 60.

FIGS. 13 to 16 show a modification of the brake pedal in the third embodiment. The brake pedal 70 is in the form of bent rectangle, and its surface area 71 is large enough to allow the driver's foot to be put thereon. The brake pedal 70 has a transmission rod 72 pivotally attached to its rear side.

A guide slope 73 is provided to the upper, right part of the foot plate 71, and a rectangular opening 73a is made in the guide slope 73. The rectangular opening 73a has a longitudinal pivot 74, which has a guide roller 75 and a foot-push lever 76 rotatably fixed thereto.

A plurality of ridges 77 extend laterally leftward from the guide slope 73, thereby reducing the area of the foot plate 71 which the sole of the driver's foot contacts, accordingly reducing the friction therebetween. Also, a plurality of longitudinal ridges 78 are provided to the left, upper part of the foot plate 71 to prevent the slipping-off of the driver's foot from the foot plate 71. A horseshoe-shaped depression 79 is formed at the center of the lower edge of the foot plate 71 to permit the heel of the driver's foot thereon. A semicylindrical projection 80 is provided to the rear side of the horseshoe-shaped depression 79, thereby facilitating the sliding of the brake pedal 70 on the floor.

The guide roller 75 partly appears from the rectangular opening, and is adapted to rotate in either direction, that is, clockwise and anticlockwise. The right section of the foot-push lever 76 extends aslant and upward beyond the upper edge of the guide roller 75, and a resilient stopper 81 abuts against the overlying foot lever 76 to prevent the clockwise rotation of the foot lever 76. As best seen from FIG. 16, the foot lever 76 has three consecutive flat sections X, Y and Z increasingly steep in the order named, and a hemispherical projection 76b is integrally connected to the rear surface of the upper end of the foot-push lever 76, abutting against the accelerator pedal 60.

The resilient stopper 81 is generally L-shaped in section, and is composed of a horizontal section 81a bridging across the rectangular opening 73a, and a consecutive vertical section 81b integrally connected to the horizontal section 81a and rising up therefrom. The rising section 81b is bolted to the brake pedal, and the end of the rising section 81b abuts the foot-push lever 76 to apply a resilient force to the foot-push lever 76 and push it leftward. The foot-push lever 76 has a flat base 76c to hold the foot-push lever 76 upright on the horizontal section 81a of the resilient stopper 81 in non-load condition.

The driver can take a driving posture when the driver puts the heel of his foot on the depression 79 of the brake pedal 70 with the lower edge of the heel on the floor. In operating the brake pedal 70, the driver's foot pushes down the brake pedal without shifting his foot. In operating the accelerator pedal 60, the driver turns his foot about the heel of the foot, thereby shifting his foot toward the accelerator pedal 60 via the longitudinal and lateral ridges 78 and 77 and the guide slope 73 until the right edge of the toe of his foot has come to contact the three-consecutive sectioned surface 76a of the foot-push lever 76. When the driver's foot pushes the foot-push lever 76, the rising section 81b of the stopper 81 will be yieldingly bent, thereby allowing the foot-push lever 76 to push the accelerator pedal 60 via the hemispherical projection 76b. A necessary push to operate the accelerator pedal 60 may be given by applying a given force to the surface of the foot-push lever 76 no matter in which direction the force may be directed, horizontally rightward, vertically downward or slantwise downward.

The acceleration can be controlled by controlling the pushing force to the foot-push lever 76. In switching from the acceleration to braking operation it suffices that the driver turns his foot about the heel of the foot anticlockwise toward the original position, and then pushes down the brake pedal 70. When the driver's foot turns leftward to stop acceleration, the foot-push lever 76 will rise upright under the influence of the rising piece 81b of the resilient stopper 81, and at the same time, the accelerator pedal 60 will return to the non-load, original position. Then, the driver's foot can be turned faster by the guide roller 75.

Figure 17:
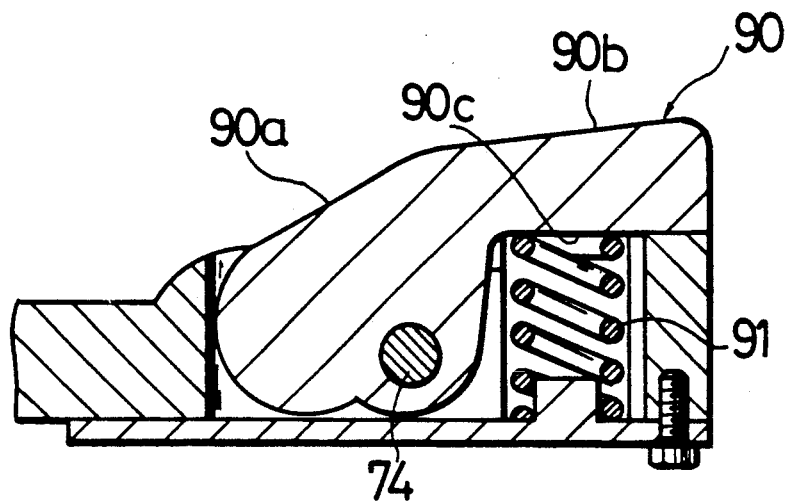
FIG. 17 is a lateral section of another foot-push lever.

FIG. 17 shows another example of foot-push lever 90, which is pivoted to the brake pedal at 74. It comprises two consecutive inclined surface sections 90a and 90b on its front side and an engagement surface 90c on its rear side. A coiled spring 91 is fixed to the right end of the brake pedal to push the engagement surface 90c of the foot-push lever 90, thereby keeping the foot-push lever 90 in its non-load, rising position.

Figure 18:
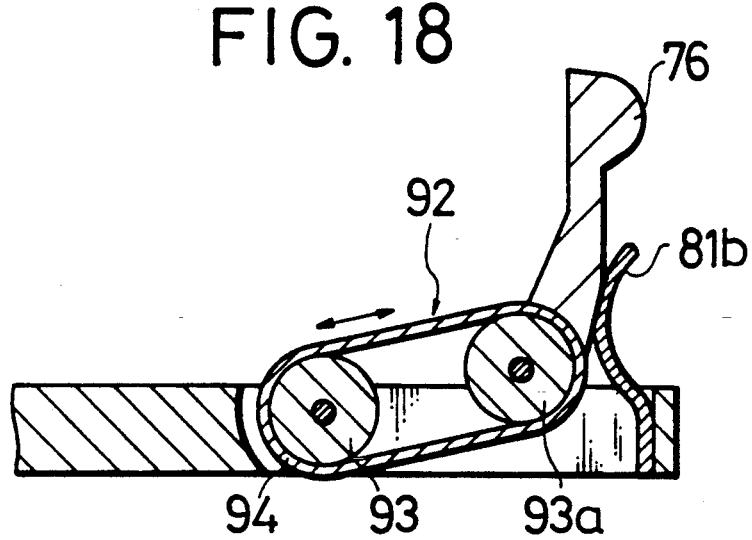
FIG. 18 is a lateral section of another guide roller.

FIG. 18 shows another example of guide roller 92. It comprises two rollers 93, 93a connected by an endless belt 94. This arrangement permits reduction of the level difference between the guide roller circumference and the brake pedal surface, and accordingly the driver's foot can move smoothly without slipping.

Figure 19:
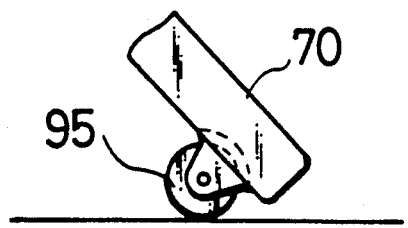
FIG. 19 is a side view of a slide projection of the foot pedal.

As shown in FIG. 19, the sliding projection of the brake pedal 70 may be a roller 95.

The above embodiments are described as being applied to automatic automobiles equipped with no clutch pedals. As a matter of course, a similar mechanism can be equally applied to a clutch pedal in an ordinary automobile by eliminating the parts associated with the accelerator pedal.

It should be understood that a variety of modifications can be made within the spirit of the present invention defined in

I claim:

1. A brake-and-accelerator pedal assembly for an automobile, comprising:

a brake pedal which is movable in a longitudinal direction, said brake pedal including an opening in a surface thereof, and a guide roller mounted thereto, wherein a portion of said guide roller projects through said opening, said roller being rotatable in opposite directions to cause a ball of a driver's foot to move smoothly leftward and rightward upon engagement of said portion of said roller and the driver's foot; and an accelerator pedal which is pivotable in a lateral direction with respect to said longitudinal direction, said accelerator pedal being pivotably mounted to a selected stationary part of the automobile, and is resiliently urged toward a center of said brake pedal from one side thereof, wherein acceleration drive is controlled by rotating the driver's foot about a heel thereof to push said accelerator pedal laterally, said acceleration pedal also being pivotable in said longitudinal direction, and being resiliently urged in said longitudinal direction toward the surface of said brake pedal.

2. A brake-and-accelerator pedal assembly claimed in claim 1 wherein said brake pedal has a first permanent magnet of a first polarity fixed to one side thereof, and a second permanent magnet of an opposite polarity from said first polarity is fixed to a selected stationary part of the automobile to be placed in the vicinity of said first permanent magnet.

3. A brake-and-accelerator pedal assembly claimed in claim 2 wherein said brake pedal has a guide slope gradually rising and extending to said one side.

4. A brake-and-accelerator pedal assembly claimed in claim 1 wherein said brake pedal has an inclined plate integrally connected to one side thereof, said inclined plate having a shallow recess on an outer side thereof to allow a ball member to be partly fitted in said shallow recess, pushing said rising plate with a leftward force under a resilient influence of a spring to hold said brake pedal in a non-load position.

5. A brake-and-accelerator pedal assembly claimed in claim 1 wherein a proximal edge of said brake pedal is tapered upward toward said accelerator pedal, decreasing a width of said brake pedal, wherein a substantial space is formed between a maximum width and a minimum width of said brake pedal, and wherein said accelerator pedal further comprises a foot step which is integrally connected thereto and extending toward the center thereof, and wherein said foot step is accommodated in said substantial space.

6. A brake-and-accelerator pedal assembly claimed in claim 1, wherein said brake pedal is sized to permit a heel-to-toe area of the driver's foot to be supported thereon, and wherein a lower edge of said brake pedal slidably engages a floor of the automobile, and wherein an upper portion of said brake pedal being rotatably fixed to an associated brake rod.

7. A brake-and-accelerator pedal assembly claimed in claim 6, wherein said brake pedal further comprises a foot-push lever to be pushed laterally and thereby laterally engaging the accelerator pedal, said foot-push lever being rotatably fixed to one side of said brake pedal.

8. A brake-and-accelerator pedal assembly claimed in claim 7 wherein said foot-push lever is adapted to be biased toward a vertical position, to project upward from a contact surface of said brake pedal.

9. A brake-and-accelerator pedal assembly claimed in claim 6 wherein a recess is made in the brake pedal to permit the heel of the driver's foot to be fitted therein.

* * * * *